UNITED STATES PATENT OFFICE.

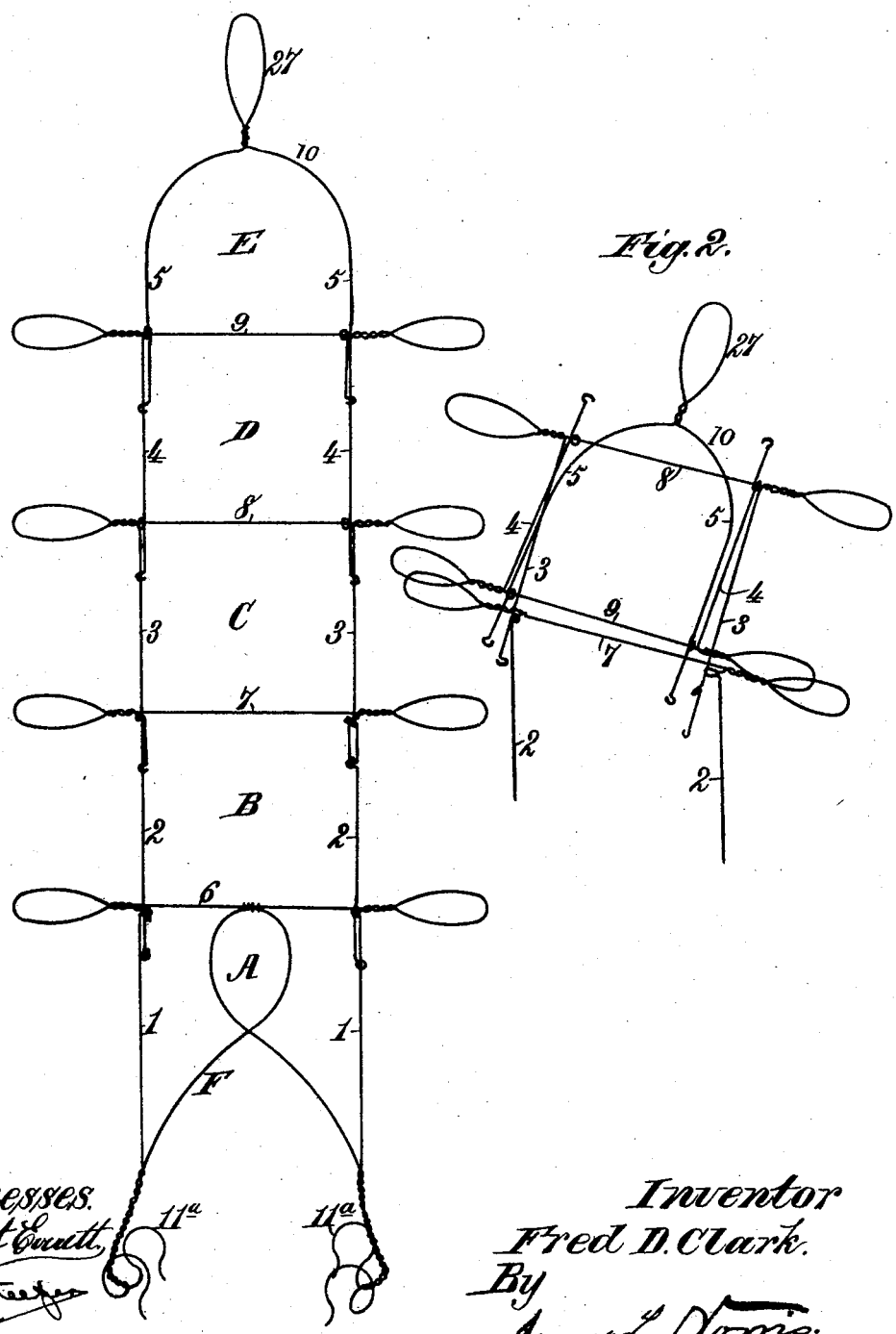

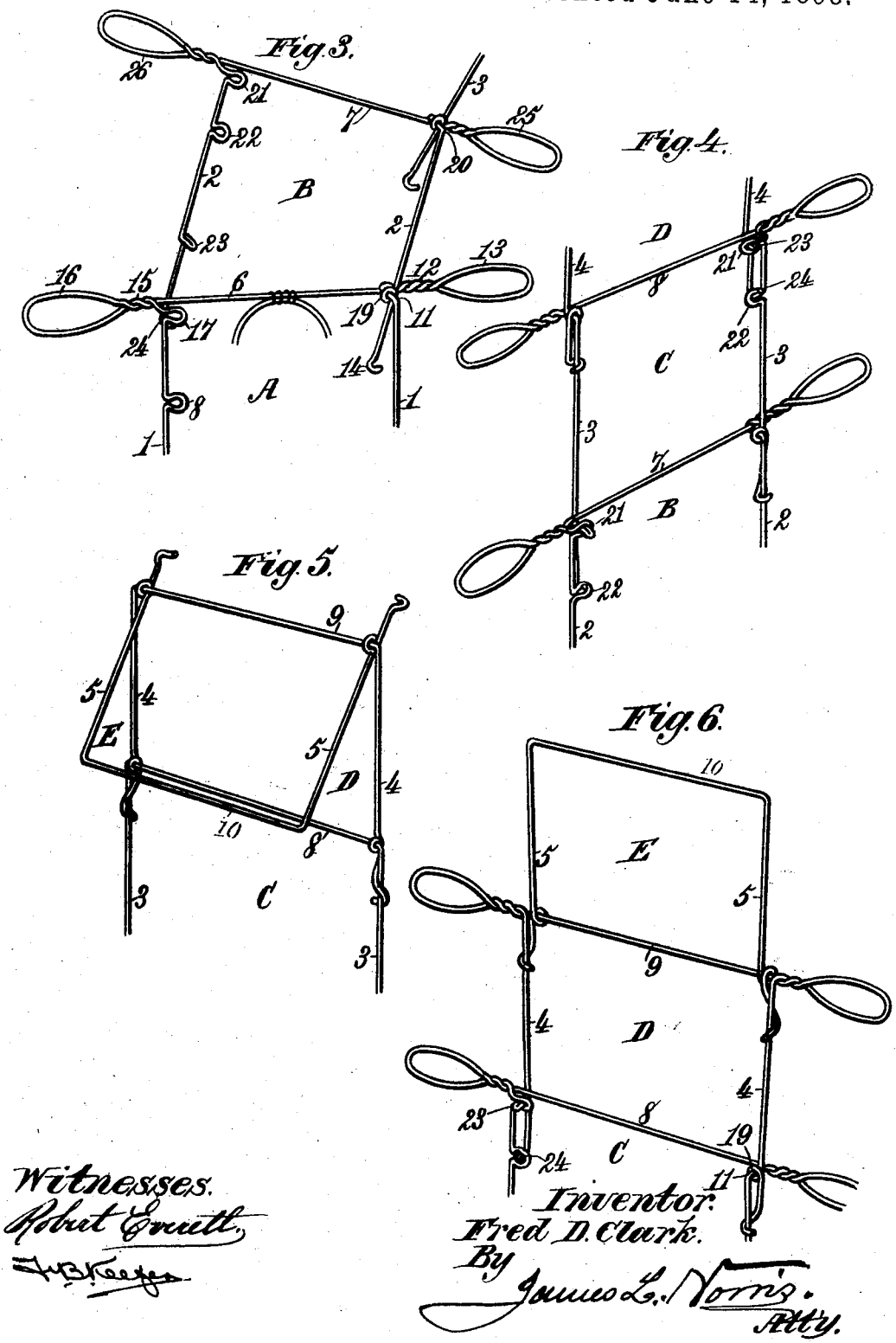

FRED D. CLARK, OF PRATTSBURG, NEW YORK.

TRELLIS.

SPECIFICATION forming part of Letters Patent No. 605,698, dated June 14, 1898.

Application filed August 30, 1897. Serial No. 649,985. (No model.)

*To all whom it may concern:*

Be it known that I, FRED D. CLARK, a citizen of the United States, residing at Prattsburg, in the county of Steuben and State of New York, have invented new and useful Improvements in Trellises, of which the following is a specification.

This invention relates to that type of trellis designed to be attached to a flower-pot or other receptacle containing a growing plant or vine for the purpose of supporting or training the same as it grows and increases in height, the trellis being mounted on the pot or other receptacle through the medium of spring-clamps forming a part of the base of the trellis, as described and shown in Letters Patent No. 581,896, issued May 4, 1897, to myself and G. W. Warren.

The chief object of my present invention is to improve the trellis referred to by rendering it susceptible of being lengthened or shortened, so that its height may be increased or diminished to suit the conditions required, according to the height of the plant or vine, in such manner that as the same increases in height the trellis may be conveniently and quickly extended vertically to any required extent. In my application filed May 22, 1897, Serial No. 636,782, I show a means for accomplishing this object, which consists of a number of suitably-constructed frames slidable vertically in operative connection with one another.

It is the object of my present invention to accomplish the same results mentioned in my application above referred to by means of a number of frames having pivotal connection with each other and adapted to be turned or swung into operative position to increase the height of the trellis.

A further object relates to the provision of means for retaining the frames in an upright position.

Still further objects relate to certain details of construction and to the combination and arrangement of parts, whereby the results referred to may be attained.

In the drawings, Figure 1 is a view in elevation, showing the trellis fully extended and provided with means for attachment to a suitable receptacle for plants or vines. Fig. 2 is a view of the trellis, showing one section or frame elevated into operative position and the next one only partially so. Fig 3 is an enlarged detail view of two sections, showing one of them partly elevated into position. Fig. 4 is a like view showing the sections adapted to be swung at alternate sides of the trellis. Fig. 5 is an enlarged view of a modification, showing a construction in which the sections are adapted to be turned to fold upon each other; and Fig. 6 is a perspective view showing the two constructions combined in the same trellis.

In order to enable those skilled in the art to make and use my invention, I will now describe the same in detail, referring to the drawings, in which the numerals 1 2 3 4 5 indicate the legs or arms, and 6 7 8 9 10 the transverse arches or members, respectively, of a number of wire frame-sections A B C D E, which are adapted to be arranged in operative connection, as hereinafter explained, to form a trellis particularly designed for supporting or training plants or vines while they are growing. The arms 1 of the lower or base frame or section A are provided with spring-clamps 11$^a$, constructed to clasp the edge of a flower-pot or other suitable receptacle containing a growing plant. The clamps grip the inner and outer edges of the receptacle and serve to maintain the trellis as a whole in a perpendicular position, or approximately so. The trellis may, however, be supported in an upright position by any suitable means; but I prefer to employ the clamps and to construct them the same as those described in my patent before mentioned, whereby the trellis can be quickly connected with or disconnected from the receptacle. A brace-frame F, the free ends of which form part of the spring-clasps, connects the arms 1 of said base-frame with its arch member 6. This brace-frame is constructed in the same manner as described in the patent referred to and serves to strengthen the base-frame.

The individual frames or sections above mentioned are each preferably formed from a single piece of wire, which for reasons of economy and for the reason that it can be readily bent or shaped to the proper configuration I consider the best material to employ in the construction of the entire device; but they may be made from bars or rods of metal, or of any other material suitable for the purpose. In this description, therefore, I will assume that wire is employed without limiting myself to such use.

Referring to Fig. 3, the lower or base frame A above the spring-clamps is shown to be formed as follows, assuming that a single strand of wire is used. At the top of arm 1 at the right of the figure the wire is bent at substantially a right angle to itself to form a shoulder 11. It is then bent over and twisted at 12 to form the loop 13, extended horizontally across the frame to form the transverse arch or member 6, bent upon itself and twisted at 15 to form the loop 16, and then extended downward to form the other arm 1, having been first bent in the places indicated to form the eyes or recesses 17 18. The frame B has one of its arms 2 (that shown at the right) formed with a single convolution or eye 19 to encircle the wire of the shoulder 11, thereby to form a hinge or pivot connection, and at its top with a shoulder 20, similar to shoulder 11. At the lower extremity of this arm is a spring clasp or hook 14. The opposite side of frame B has in its upper portion the eyes 21 22, and the wire of arm 2 is bent at its lower extremity to form the hooks or projections 23 24. This frame likewise has the side loops 25 26. The remaining frames C D E have the same construction as that just described until the topmost frame is reached, when the side loops may be dispensed with and the wire manipulated to form an ornamental portion 27 in the center.

The method of operation is as follows: It being desired to increase the height of the trellis the frame B is turned on its hinge 11 19 to an elevated position, when the hooks 23 24 will be opposite the eyes 17 and 18, respectively, which are open at the sides to permit lateral entrance, and may be readily sprung into engagement with said eyes. The lower part of arm 2 at the right is also sprung outward to permit clasp 14 to engage the arm 1. By these means it will be seen that the frame B will be held firmly in an upright position. The same method of procedure obtains with the remaining frames. To lower frame B, the hooks 14, 23, and 24 are disengaged and the frame swung laterally and downwardly out of position.

In Fig. 4 I have shown a construction in which the frames are adapted to be swung at alternate sides of the trellis, the only change of construction involved over that described with reference to frame B being that the positions of eyes 21 and 22 and shoulder 20 are reversed, as plainly shown.

In Fig. 5 I have shown a modification of my invention, in which the frame-sections are adapted to fold on each other. In this construction the arms 2 3 4 of each frame are given a single convolution $a$ to adapt them to encircle the arch members 6 7 8 of the adjacent frame, and a continuation of the arms is bent outwardly and inwardly to form a spring-clasp $b$. It will be readily understood that when it is desired to increase the height of the trellis a frame B, C, or D is turned upward and the clasps $b$ are sprung around the arms of a lower frame to hold it in an upright position. The clamps $b$ in this construction and the hooks 23, 24, and 14 in that first described serve also to brace the frame-sections when in position.

Referring to Fig. 6, it is seen that I here combine in one device the two constructions previously described. In this device I use the construction shown in Figs. 3 and 4 for the lower frame or frames, as they can be more readily elevated one at a time than is the case with the folding construction shown in Fig. 5. This is important while the plant is small, as the trellis may be maintained at a height proportionate to the size of plant. After the plant is larger I am enabled to use the folding frames for the top sections of the trellis. It will be understood, however, that I may use either construction separately or combine the two in one device, as the exigencies of the case may require.

While I have shown and described my device as having certain ornamental loops at the sides and top thereof, I wish it understood that I do not limit my invention to the particular shape or configuration of trellis shown, but may vary the same or dispense with all ornamental configuration whatsoever, as expediency may dictate; and I wish it further understood that while I have shown and described my device as made from wire it may be made from other materials and the parts assembled in a different manner from that shown without departing from the spirit of my invention.

Having thus fully described my invention, what I claim is—

1. A trellis comprising a number of frames connected in vertical series and adapted to be turned to position to increase the height of the trellis, substantially as described.

2. A trellis comprising a number of frames connected in vertical series and adapted to be turned to position to increase the height of the trellis, and means for maintaining each frame in its adjusted position, substantially as described.

3. A trellis comprising a number of frames connected in vertical series and adapted to be turned into and out of operative positions whereby, respectively, to increase or diminish the height of the trellis, and means on one of the frames for engaging a suitable support by which the trellis is maintained in an upright position, substantially as described.

4. A trellis comprising a number of frames connected in vertical series and adapted to be turned into and out of operative positions whereby, respectively, to increase or diminish the height of the trellis, and clamping devices on the lower or base frame for engaging a suitable receptacle, substantially as described.

5. A trellis comprising a number of frames connected in vertical series and adapted to be turned into and out of operative positions whereby, respectively, to increase or diminish the height of the trellis, clamping devices on the lower or base frame, and a brace-frame connecting the arm members and arch member of said lower or base frame, substantially as described.

6. A trellis comprising a number of frames connected in vertical series and adapted by being turned laterally to be brought to position for use, and means operating both to hold and to brace the frames when in this position, substantially as described.

7. A trellis comprising a number of frames each composed of side arm members connected at the top by a transverse arch member, the arms of the base or lower frame having means to engage a suitable receptacle, and an arm of each remaining section having pivoted connection with the adjacent frame, substantially as described.

8. A trellis comprising a number of frames each composed of side arm members connected at the top by a transverse arch member, the base or lower frame having means for supporting the trellis in an upright position, one arm of each remaining frame having a pivotal connection with the adjacent frame and means on the other arm for retaining the frame in an upright position, substantially as described.

9. A trellis comprising a number of frames each composed of side arm members connected at the top by a transverse arch member, means on the base or lower frame for supporting the trellis in an upright position, one arm of each remaining frame having a pivoted connection with the adjacent frame, and means on the other arm for maintaining the frame in an upright position comprising hooks or projections for engaging eyes or recesses in the adjacent frame.

10. A trellis comprising a number of connected frames each frame consisting of a single piece of wire bent to form two parallel side arm members and a top arch member, one side arm member being provided at its bend with a shoulder, at its end with a hook or clasp, and intermediate of its ends with an eye, and the other member being provided adjacent to its bend with eyes and at its end with hooks or projections, substantially as described.

In testimony whereof I have hereunto set my hand in presence of two subscribing witnesses.

FRED D. CLARK.

Witnesses:
   HERBERT THOMAS,
   STEPHEN WILLIAMS.